(12) United States Patent
Yeh et al.

(10) Patent No.: US 10,444,351 B2
(45) Date of Patent: Oct. 15, 2019

(54) ELECTRONIC DEVICE AND METHOD FOR OPERATION THEREOF

(71) Applicant: NATIONAL TSING HUA UNIVERSITY, Hsinchu (TW)

(72) Inventors: Chih-Kuang Yeh, Hsinchu (TW); Hsaing-Ching Lin, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 624 days.

(21) Appl. No.: 15/074,118

(22) Filed: Mar. 18, 2016

(65) Prior Publication Data

US 2017/0090027 A1    Mar. 30, 2017

(30) Foreign Application Priority Data

Sep. 25, 2015   (TW) .............................. 104131727 A (51) Int. Cl.
*G01S 15/42*   (2006.01)
*G06F 3/01*   (2006.01)

(52) U.S. Cl.
CPC ............... *G01S 15/42* (2013.01); *G06F 3/01* (2013.01)

(58) Field of Classification Search
CPC .................................. G01S 15/42; G06F 3/01
See application file for complete search history.

(56) References Cited

U.S. PATENT DOCUMENTS

| | | |
|---|---|---|
| 6,348,856 B1 | 2/2002 | Jones et al. |
| 6,553,013 B1 | 4/2003 | Jones et al. |
| 8,276,453 B2 | 10/2012 | Chang et al. |
| 8,941,619 B2 | 1/2015 | Lee |
| 2002/0198470 A1* | 12/2002 | Imran et al. |
| 2004/0180316 A1 | 9/2004 | Yang |
| 2007/0043458 A1* | 2/2007 | Pinnegar |
| 2009/0046864 A1* | 2/2009 | Mahabub et al. |
| 2010/0191792 A1* | 7/2010 | Brown et al. |
| 2011/0222694 A1* | 9/2011 | Del Galdo et al. |
| 2011/0245671 A1* | 10/2011 | Sato .................. A61B 8/0808 600/443 |

(Continued)

FOREIGN PATENT DOCUMENTS

| | | |
|---|---|---|
| CN | 1530891 A | 9/2004 |
| CN | 101325755 A | 12/2008 |

(Continued)

*Primary Examiner* — Luke D Ratcliffe
*Assistant Examiner* — Amie M Ndure (57) ABSTRACT

The present invention provides an embodiment of an electronic device, including: an ultrasonic transmitting transducer, arranged to transmit a first ultrasonic signal, at a first time point, to an object to be tested at a first time point, wherein the first ultrasonic signal is reflected by the object to be tested to serve as a second ultrasonic signal; first, second and third ultrasonic receiving transducers, arranged to receive the second ultrasonic signal; and a processor, arranged to use Short-Time Fourier Transform to calculate a second time point, a third time point, and a fourth time point at which the first, second and third ultrasonic receiving transducers receive the second ultrasonic signal, and arranged to calculate the relative positions of the object to be tested and the ultrasonic transmitting transducer according to the second time point, the third time point, and the fourth time point.

15 Claims, 10 Drawing Sheets

(56) References Cited

U.S. PATENT DOCUMENTS

2013/0058492 A1* 12/2013 Silzle et al.
2015/0068069 A1* 3/2015 Tran et al.
2016/0074017 A1* 3/2016 Lee

FOREIGN PATENT DOCUMENTS

| JP | 2013244167 A | * 12/2013 | ............... A61B 8/00 |
| TW | I387900 | 3/2013 | |
| TW | I472991 | 2/2015 | |

* cited by examiner

ELECTRONIC DEVICE AND METHOD FOR OPERATION THEREOF

CROSS REFERENCE TO RELATED APPLICATIONS

This application claims priority of Taiwan Patent Application No. 104131727, filed on Sep. 25, 2015, the entirety of which is incorporated by reference herein.

BACKGROUND OF THE INVENTION

Field of the Invention

The present invention relates to a position-detection method, and in particular to a position-detection method utilizing ultrasonics and the corresponding electronic device thereof.

Description of the Related Art

There are many methods for controlling electronic devices. These include touching a touch panel, or pressing buttons. However, in order to work, these control methods require the user to perform actions such as touching the control device of the electronic device. In many cases, control methods that require physical contact are not suitable in certain real-life situations. For example, in the field of medicine, a doctor is not able to control medical equipment via touch while performing surgery. In cases such as this, controlling the medical equipment is a task that must be carried out by other people. As a result, the goal of the present invention is to provide a method to control an electronic device without having to touch it, while having the same effect as touching.

BRIEF SUMMARY OF THE INVENTION

In view of this, the present invention provides a technique of utilizing a Short-time Fourier Transform and a method of configuring the ultrasonic transducers of the electronic device so that the user can more precisely and quickly obtain the position of the object to be tested.

The present invention provides an embodiment of an electronic device, comprising: an ultrasonic transmitting transducer, arranged to transmit a first ultrasonic signal, at a first time point, to an object to be tested, wherein the first ultrasonic signal is reflected by the object to be tested to serve as a second ultrasonic signal; first, second and third ultrasonic receiving transducers, arranged to receive the second ultrasonic signal; and a processor, arranged to use Short-Time Fourier Transform to calculate a second time point, a third time point, and a fourth time point at which the first to the third ultrasonic receiving transducers receive the second ultrasonic signal, and arranged to calculate the relative positions of the object to be tested and the ultrasonic transmitting transducer according to the second time point, the third time point, and the fourth time point.

The present invention provides an embodiment of an electronic device, comprising: an ultrasonic transmitting transducer, arranged to transmit a first ultrasonic signal, at a first time point, to an object to be tested, wherein the first ultrasonic signal is reflected by the object to be tested to serve as a second ultrasonic signal; first, second, third, and fourth ultrasonic receiving transducers, arranged to receive the second ultrasonic signal, wherein the first to the fourth ultrasonic receiving transducers, and the ultrasonic transmitting transducer are located on a plane, the ultrasonic transmitting transducer serves as an origin of the plane, the first, and the second ultrasonic receiving transducers are arranged along a first axis, and the third, and the fourth ultrasonic receiving transducers are arranged along a second axis; and a processor, arranged to use Short-Time Fourier Transform to calculate a second time point, a third time point, a fourth time point, and a fifth time point at which the first to the fourth ultrasonic receiving transducers receive the second ultrasonic signal, and arranged to calculate the relative positions of the object to be tested and the ultrasonic transmitting transducer by the second time point, the third time point, the fourth time point, and the fifth time point.

The present invention also provides an embodiment of an operation method of electronic device, including: transmitting a first ultrasonic signal, at a first time point, to an object to be tested, wherein the first ultrasonic signal is reflected by the object to be tested as a second ultrasonic signal; receiving the second ultrasonic signal by first, second and third ultrasonic receiving transducers; utilizing Short-Time Fourier Transform to calculate a second time point, a third time point, and a fourth time point at which the first to the third ultrasonic receiving transducers receive the second ultrasonic signal; and calculating the relative positions of the object to be tested and an ultrasonic transmitting transducer using the values of the second time point, the third time point, and the fourth time point.

The present invention can be more fully understood by reading the subsequent detailed description and examples with references made to the accompanying drawings, wherein:

DETAILED DESCRIPTION OF THE INVENTION

The present invention will be discussed in detail in the examples of a variety of methods described. However, it should be noted that many viable concepts provided by the present invention may be implemented in a variety of specific ranges. These specific examples are merely illustrative of the manufacturing and the usage method of the present invention, but they are not intended to limit the scope of the present invention.

Figure 1:
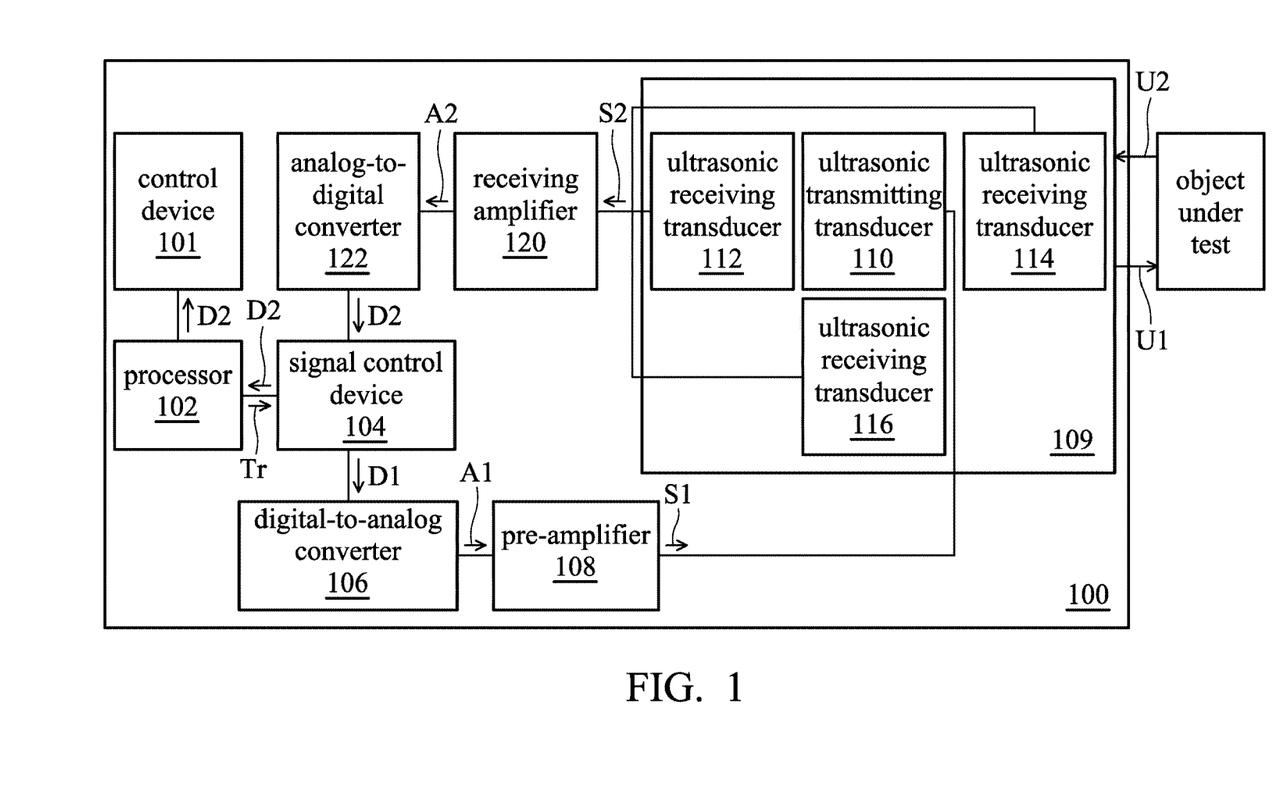
FIG. 1 is a schematic diagram of an electronic device according to an embodiment of the present invention.

FIG. 1 is a schematic diagram of an electronic device 100 according to an embodiment of the present invention. The electronic device 100 includes a processor 102, a signal control device 104, a digital-to-analog converter 106, a pre-amplifier 108, an ultrasonic transducer device 109, a receiving amplifier 120, and an analog-to-digital converter 122. The ultrasonic transducer device 109 includes an ultrasonic transmitting transducer 110 and ultrasonic receiving transducers 112, 114, and 116. In one embodiment of the present invention, the electronic device 100 further comprises a control device 101.

The signal control device 104 is arranged to receive a trigger signal Tr from the processor 102 to generate a first digital signal D1, and then to transmit the first digital signal D1 to the digital-to-analog converter 106. The signal control device 104 is also arranged to receive a second digital signal D2 from the analog-to-digital converter 122, and transmits the second digital signal D2 to the processor 102. For example, the signal control device 104 is provided with a square-wave generator (not shown). The signal control device 104 generates square-wave signals to the digital-to-analog converter 106 after receiving the trigger signal Tr.

The digital-to-analog converter 106 is arranged to receive the first digital signal D1 from the signal control device 104, and then to convert the first digital signal D1 into a first analog signal A1. For example, the first digital signal D1 could be square-wave signals, and the first analog signal A1 could be sinusoidal-wave signals.

The pre-amplifier 108 is arranged to amplify the first analog signal A1 to serve as a driving signal S1, and then to transmit the driving signal S1 to the ultrasonic transmitting transducer 110. For example, the pre-amplifier 108 is a voltage amplifier. The pre-amplifier 108 amplifies the voltage of the first digital signal D1 so that the first digital signal D1 becomes the driving signal S1 for increasing the power of the driving signal S1.

The ultrasonic transmitting transducer 110 is arranged to receive the driving signal S1 from the pre-amplifier 108, and then to transmit an ultrasonic signal U1 to an object to be tested (or an object under test) after converting the driving signal S1 into the ultrasonic signal U1. The ultrasonic signal U1 is reflected by the object to be tested to serve as an ultrasonic signal U2 and received by the ultrasonic receiving transducers 112, 114, and 116. In one embodiment of the present invention, the time point at which the ultrasonic signal U1 is transmitted by the ultrasonic transmitting transducer 110 is defined as the first time point t1.

Every one of the ultrasonic receiving transducers 112, 114, and 116 is arranged to receive an ultrasonic signal U2 reflected by the object to be tested, respectively. Every one of the ultrasonic receiving transducers 112, 114, and 116 also transmits a receiving signal S2 to the receiving amplifier 120 respectively after converting the ultrasonic signal U2 into the receiving signal S2. For example, the ultrasonic transmitting transducer 110 and the ultrasonic receiving transducers 112, 114, and 116 could all be probes. The time point at which the ultrasonic receiving transducer 112 receives the ultrasonic signal U2 is defined as the second time point t2. The time point at which the ultrasonic receiving transducer 114 receives the ultrasonic signal U2 is defined as a third time point t3. The time point at which the ultrasonic receiving transducer 116 receives the ultrasonic signal U2 is defined as the fourth time point t4. It should be noted that the second time point t2, the third time point t3, and the fourth time point t4 are obtained utilizing the Short-Time Fourier Transform for the spectrum analysis and calculation of the specific frequency. The receiving amplifier 120 is arranged to amplify the receiving signal S2 to serve as a second analog signal A2, and then to transmit the second analog signal A2 to the analog-to-digital converter 122. For example, the receiving amplifier 120 is a voltage amplifier. The receiving amplifier 120 amplifies the voltage of the receiving signal S2 so that the receiving signal S2 becomes the second analog signal A2 for increasing the power of the second analog signal A2.

The analog-to-digital converter 122 is arranged to receive the second analog signal A2 from the receiving amplifier 120, and to convert the second analog signal A2 into a second digital signal D2. For example, the second analog signal A2 could be sinusoidal-wave signals, and the second digital signal D2 could be square-wave signals.

The processor 102 is arranged to transmit the trigger signal Tr to the signal control device 104 to enable the whole ultrasonic position procedure. The processor 102 is also arranged to receive the second digital signal D2 from the signal control device 104 and to calculate information about the relative position of the object to be tested according to the second digital signal D2, and then to transmit the information about the relative position of the object to be tested to the control device 101. The processor 102 calculates the relative positions of the object to be tested and the ultrasonic transmitting transducer 110 according to a first time difference del1, a second time difference del2, and a third time difference del3 (shown in FIG. 1C). The first time difference del1, the second time difference del2, and the third time difference del3 (shown in FIG. 1C) are related to the time point at which the ultrasonic signal U1 is transmitted by the ultrasonic transmitting transducer 110 (the first time point t1 shown in FIG. 1C) and the points in time point at which the ultrasonic receiving transducers 112, 114, and 116 receive the ultrasonic signal U2 (the second time point t2, the third time point t3, and the fourth time point t4 shown in FIG. 1C). The ultrasonic signal U2 is derived from the ultrasonic signal U1. The ultrasonic signal U1 is transmitted to the object to be tested by the ultrasonic transmitting transducer 110, and then the object to be tested reflects the ultrasonic signal U2 to the ultrasonic receiving transducers 112, 114, and 116. In detail, the time point at which the ultrasonic transmitting transducer 110 transmits the ultrasonic signal U1 (for example, the frequency of the ultrasonic signal U1 is 40 kHz) is defined as the first time point. Due to the characteristic of the Short-Time Fourier Transform, the ultrasonic signal U2 is separated independently by the spectrum analysis to avoid the noise interference of the medium. The processor 102 then multiplies the first time difference del1, the second time difference del2, and the third time difference del3 (shown in FIG. 1C) by the transmitting speed of the second ultrasonic signal U2 in the medium (for example: water, air, and the like) respectively to obtain a first distance d21, a second distance d31, and a third distance d41 (shown in FIG. 1D). In one embodiment of the present invention, the transmitting speed of the second ultrasonic signal U2 is same as the transmitting speed of the first ultrasonic signal U1. Then, the processor 102 calculates the relative positions of the object to be tested and the ultrasonic transmitting transducer 110 according to the first distance d21, the second distance d31, and the third distance d41 (shown in FIG. 1D).

Figure 1A:
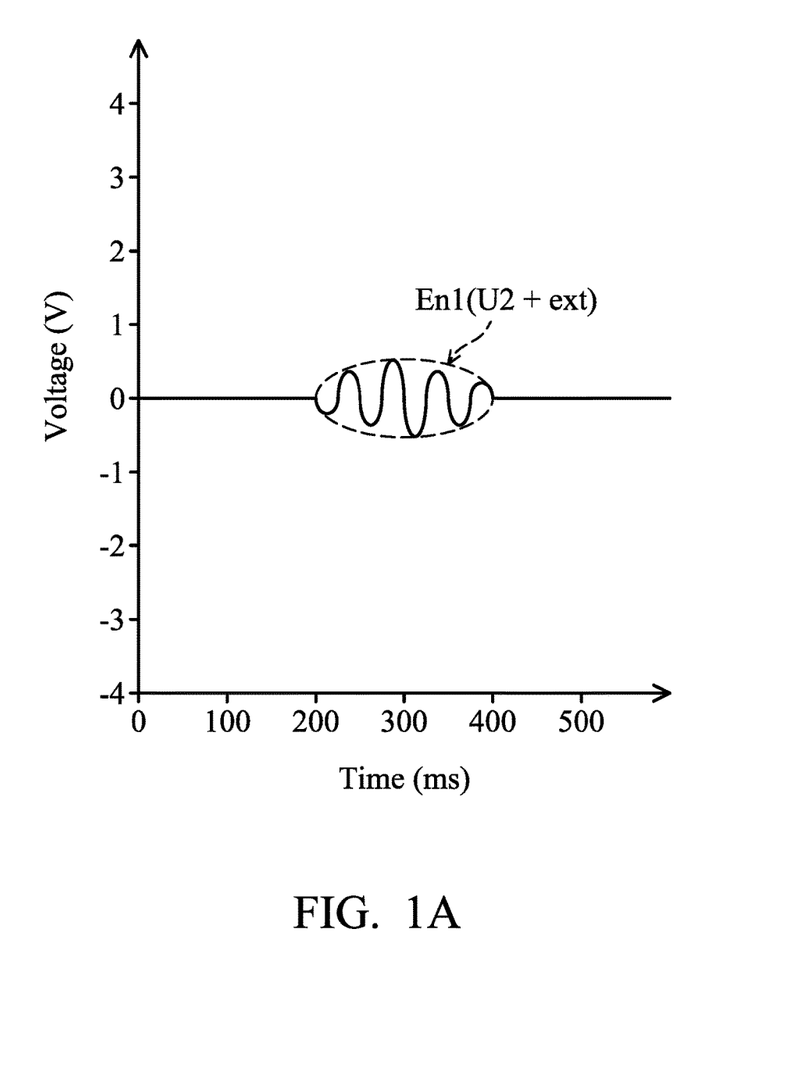
FIG. 1A is a voltage-time diagram for an ultrasonic signal and an external noise reflected to an ultrasonic receiving transducer in the air.

FIG. 1A is a voltage-time diagram for an ultrasonic signal and an external noise reflected to an ultrasonic receiving transducer in the air. As shown in FIG. 1A, a signal envelope En1 is a real signal of the second ultrasonic signal U2 and the external noise ext reflected to the ultrasonic receiving transducer 112 in the air, and the signal envelope En1 comprises the second ultrasonic signal U2 the user wants to receive and the external noise ext. The ultrasonic receiving transducer 112 is easily influenced by the external noise ext so that the processor 102 cannot precisely determine the second time point t2 (the time point at which the ultrasonic receiving transducer 112 receives the ultrasonic signal U2). Namely, during the interval between the first time point t1 and the second time point t2, the waveform caused by the external noise ext and the waveform caused by the ultrasonic signal U2 combine each other to form the signal envelope En1, and the signal envelope En1 makes it so the processor 102 cannot precisely determine the second time point t2 (the time point at which the ultrasonic receiving transducer 112 receives the ultrasonic signal U2). As a result, the processor 102 cannot calculate the relative positions of the object to be tested and the ultrasonic transmitting transducer 110. In order to overcome this problem, the present invention utilizes the Short-Time Fourier Transform to filter the external noise ext of the real signal received from the ultrasonic receiving transducer 112 to obtain the wanted ultrasonic signal U2.

Figure 1B:
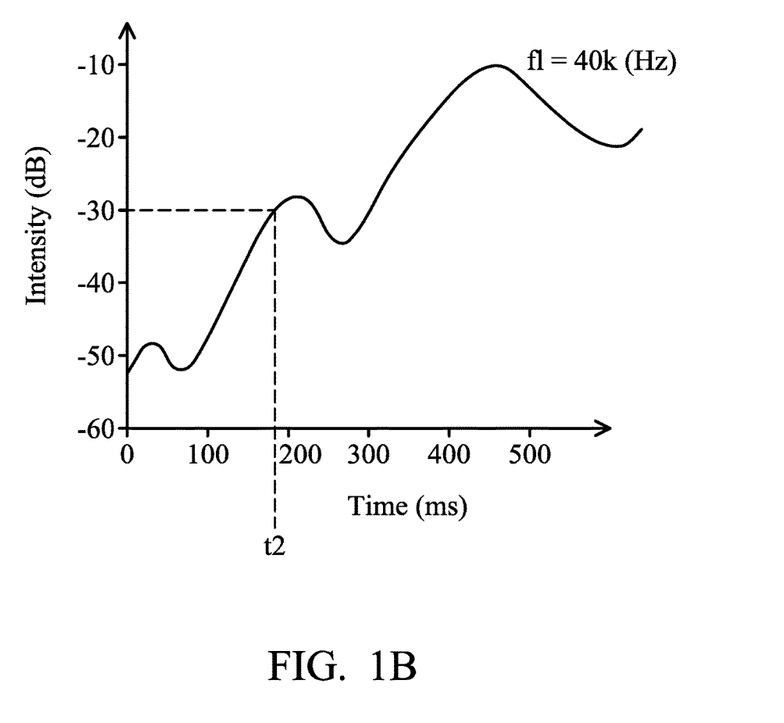
FIG. 1B is an intensity-time diagram for an ultrasonic receiving transducer, wherein FIG. 1A has utilized the Short-Time Fourier Transform to filter the external noise.

FIG. 1B is an intensity-time diagram for an ultrasonic receiving transducer, wherein FIG. 1A has utilized the Short-Time Fourier Transform to filter the external noise as FIG. 1B. As shown in FIG. 1B, after the transformation of the Short-Time Fourier Transform, FIG. 1B only display the ultrasonic signal U2 having a specific frequency f1 (for example: 40 kHz). The processor 102 determines the second time point t2 (the time point at which the ultrasonic receiving transducer 112 receives the ultrasonic signal U2) according to whether the dB value of the ultrasonic signal U2 is greater than a specific dB value (for example: −30 dB). For example, the time when the magnitude of the ultrasonic signal U2 is increased to −30 dB is defined as the second time point t2 (the time point at which the ultrasonic receiving transducer 112 receives the ultrasonic signal U2).

Figure 1C:
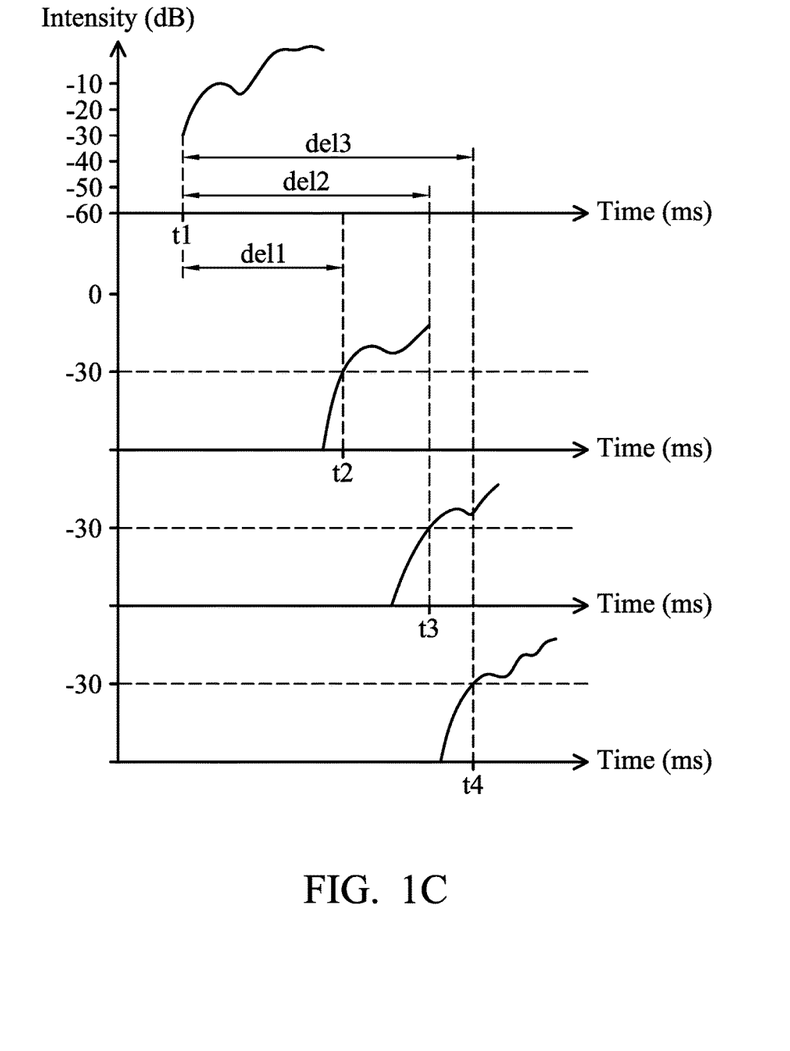
FIG. 1C is an intensity-time diagram for an ultrasonic transmitting transducer and ultrasonic receiving transducers in an electronic device.

FIG. 1C is an intensity-time diagram for an ultrasonic transmitting transducer 110 and ultrasonic receiving transducers 112, 114 and 116 in an electronic device 100. As shown in FIG. 1B, the time when the magnitude of the ultrasonic signal U2 is increased to −30 dB is defined as the second time point t2 (the time point at which the ultrasonic receiving transducer 112 receives the ultrasonic signal U2). The time when the magnitude of the ultrasonic signal U2 is increased to −30 dB is also defined as the third time point t3 (the time at which the ultrasonic receiving transducer 114 receives the ultrasonic signal U2). The time when the magnitude of the ultrasonic signal U2 is increased to −30 dB is defined as the fourth time point t4 (the time point at which the ultrasonic signal U2 is received by the ultrasonic receiving transducer 116). In one embodiment of the present invention, the first time point t1, the second time point t2, the third time point t3, and the fourth time point t4 could be the same. In another embodiment of the present invention, the first time point t1, the second time point t2, the third time point t3, and the fourth time point t4 could be different.

The processor 102 then calculates the first distance d21 (shown in FIG. 1D) according to the first time difference del1 between the first time point t1 and the second time point t2, calculates the second distance d31 (shown in FIG. 1D) according to the second time difference del2 between the first time point t1 and the third time point t3, and calculates the third distance d41 (shown in FIG. 1D) according to the third time difference del3 between the first time point t1 and the fourth time point t4.

Figure 1D:
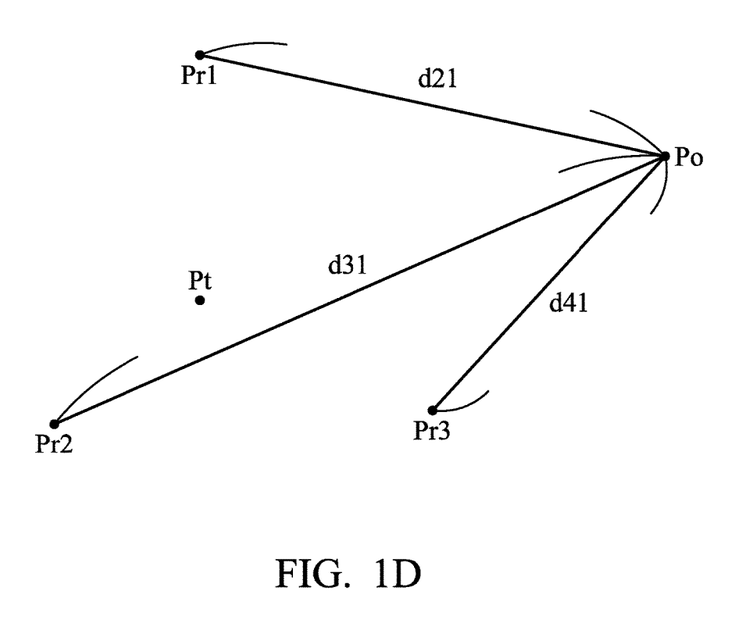
FIG. 1D is a schematic diagram illustrating the calculation of the relative positions of the ultrasonic transducer devices and the object to be tested by an electronic device.

FIG. 1D is a schematic diagram illustrating the calculation of the relative positions of the ultrasonic transducer devices and the object to be tested in an electronic device. The position from which the ultrasonic transmitting transducer 110 transmits the ultrasonic signal U1 is defined as the position Pt, the position of the object to be tested is defined as the position Po, the position from which the ultrasonic receiving transducer 112 receives the ultrasonic signal U2 that has been reflected by the object to be tested is defined as the position Pr1, the position at which the ultrasonic receiving transducer 114 receives the ultrasonic signal U2 that has been reflected by the object to be tested is defined as the position Pr2, and the position upon receiving the ultrasonic signal U2 reflected by the object to be tested by the ultrasonic receiving transducer 116 is defined as the position Pr3. The first distance d21 is the distance between the positions Pr1 and Po, the second distance d31 is the distance between the positions Pr2 and Po, and the third distance d41 is the distance between the positions Pr3 and Po.

Finally, after obtaining the first distance d21, the second distance d31, and the third distance d41, the processor 102 calculates the long axis of a first ellipsoid as half of the first distance d21, the positions of the ultrasonic receiving transducer 112 and the ultrasonic transmitting transducer 110 are regarded as two focuses of the first ellipsoid, and a first three-dimensional Cartesian coordinate system ellipsoid equation is obtained. The processor 102 then calculates the long axis of a second ellipsoid as half of the second distance d31, the positions of the ultrasonic receiving transducer 114 and the ultrasonic transmitting transducer 110 are regarded as two focuses of the second ellipsoid, and a second three-dimensional Cartesian coordinate system ellipsoid equation is obtained. Finally, the processor 102 calculates the long axis of a third ellipsoid as half of the third distance d41, the positions of the ultrasonic receiving transducer 116 and the ultrasonic transmitting transducer 110 are regarded as two focuses of the third ellipsoid, and a third three-dimensional Cartesian coordinate system ellipsoid equation is obtained. The processor 102 calculates the position of the object to be tested using the first, second, and third three-dimensional Cartesian coordinate system ellipsoid equations by solving the simultaneous equations of the three-dimensional Cartesian coordinate system ellipsoid equations.

The control device 101 is arranged to receive the information about the position of the object to be tested. For example, every time the processor 102 performs the whole ultrasonic position procedure, the processor 102 calculates a position point (the position of the object to be tested) for the object to be tested, while different position points cause a difference value. In one embodiment of the present invention, the control device 101 divides the difference value into three components (x-axis, y-axis, and z-axis). The control device 101 performs a corresponding action (for example: the corresponding action is a moving action of a mouse on the screen and the control device 101 is a computer) according to two of three components (the x-axis, y-axis, and z-axis) in a corresponding table. The control device 101 performs another corresponding action (for example: the corresponding action is a clicking action of a mouse on the screen and the control device 101 is a computer) according to the rest one of three components (the x-axis, y-axis, and z-axis) in another corresponding table.

Figure 2A:
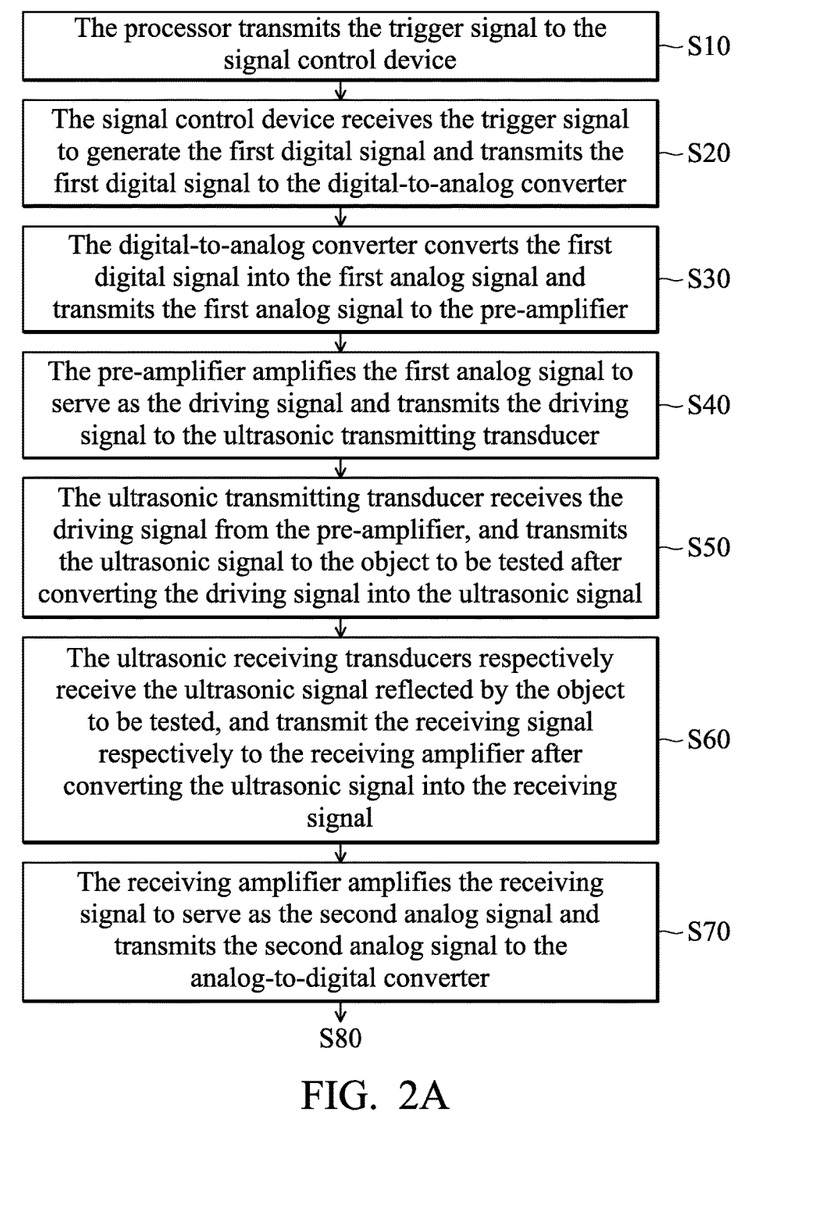
FIGS. 2A and 2B are flowcharts of an electronic device according to an embodiment of the present invention.
Figure 2B:
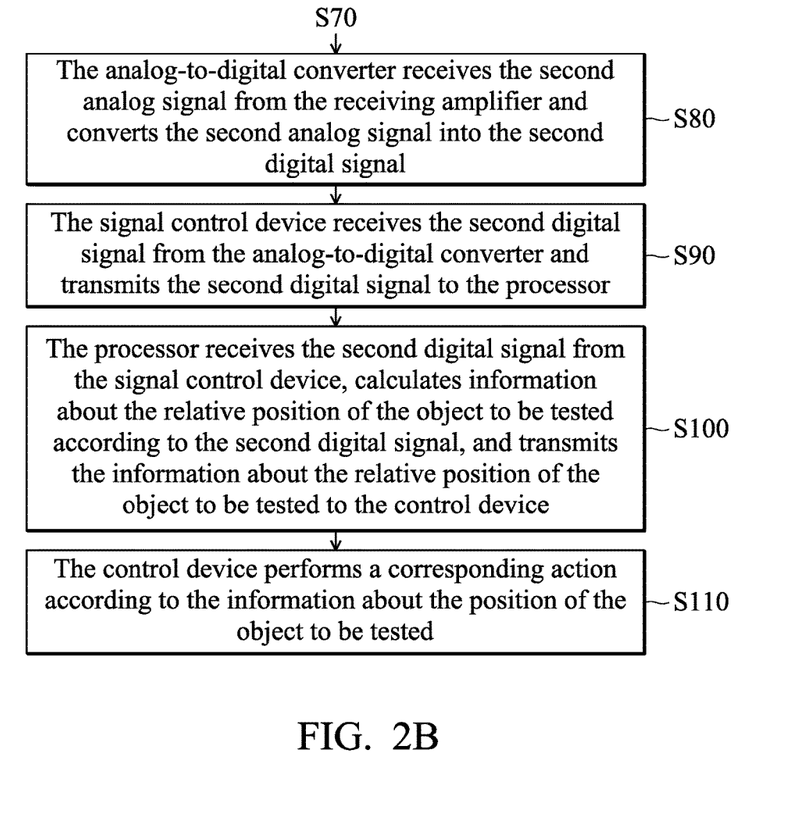

FIGS. 2A and 2B are flowcharts of an electronic device according to an embodiment of the present invention. First, in step S10, the processor 102 transmits the trigger signal Tr to the signal control device 104, and then the flowchart goes to step S20. In step S20, the signal control device 104 receives the trigger signal Tr to generate the first digital signal D1 and transmits the first digital signal D1 to the digital-to-analog converter 106, and then the flowchart goes to step S30. In step S30, the digital-to-analog converter 106 converts the first digital signal D1 into the first analog signal A1 and transmits the first analog signal A1 to the pre-amplifier 108, and then the flowchart goes to step S40. In step S40, the pre-amplifier 108 amplifies the first analog signal A1 to serve as the driving signal S1 and transmits the driving signal S1 to the ultrasonic transmitting transducer 110, and then the flowchart goes to step S50. In step S50, the ultrasonic transmitting transducer 110 receives the driving signal S1 from the pre-amplifier 108, and transmits the ultrasonic signal U1 to the object to be tested after converting the driving signal S1 into the ultrasonic signal U1, and then the flowchart goes to step S60. In step S60, the ultrasonic receiving transducers 112, 114, and 116 respectively receive the ultrasonic signal U2 reflected by the object to be tested, and transmit the receiving signal S2 respectively to the receiving amplifier 120 after converting the ultrasonic signal U2 into the receiving signal S2, and then the flowchart goes to step S70. In step S70, the receiving amplifier 120 amplifies the receiving signal S2 to serve as the second analog signal A2 and transmits the second analog signal A2 to the analog-to-digital converter 122, and then the flowchart goes to step S80. In step S80, the analog-to-digital converter 122 receives the second analog signal A2 from the receiving amplifier 120 and converts the second analog signal A2 into the second digital signal D2, and then the flowchart goes to step S90. In step S90, the signal control device 104 receives the second digital signal D2 from the analog-to-digital converter 122 and transmits the second digital signal D2 to the processor 102, and then the flowchart goes to step S100. In step S100, the processor 102 receives the second digital signal D2 from the signal control device 104, calculates information about the relative position of the object to be tested according to the second digital signal D2, and transmits the information about the relative position of the object to be tested to the control device 101. For example, the processor 102 could calculate information about the relative position of the object to be tested using the Short-Time Fourier Transform and the three-dimensional Cartesian coordinate system ellipsoid equations according to the second digital signal. In one embodiment of the present invention, the ultrasonic transmitting transducer 110 serves as the origin, and the relative position of the object depends on the relationship between the positions of the object to be tested and the ultrasonic transmitting transducer 110. Finally, the flowchart goes to step S110. In step S110, the control device 101 performs a corresponding action according to the information about the position of the object to be tested.

Figure 3:
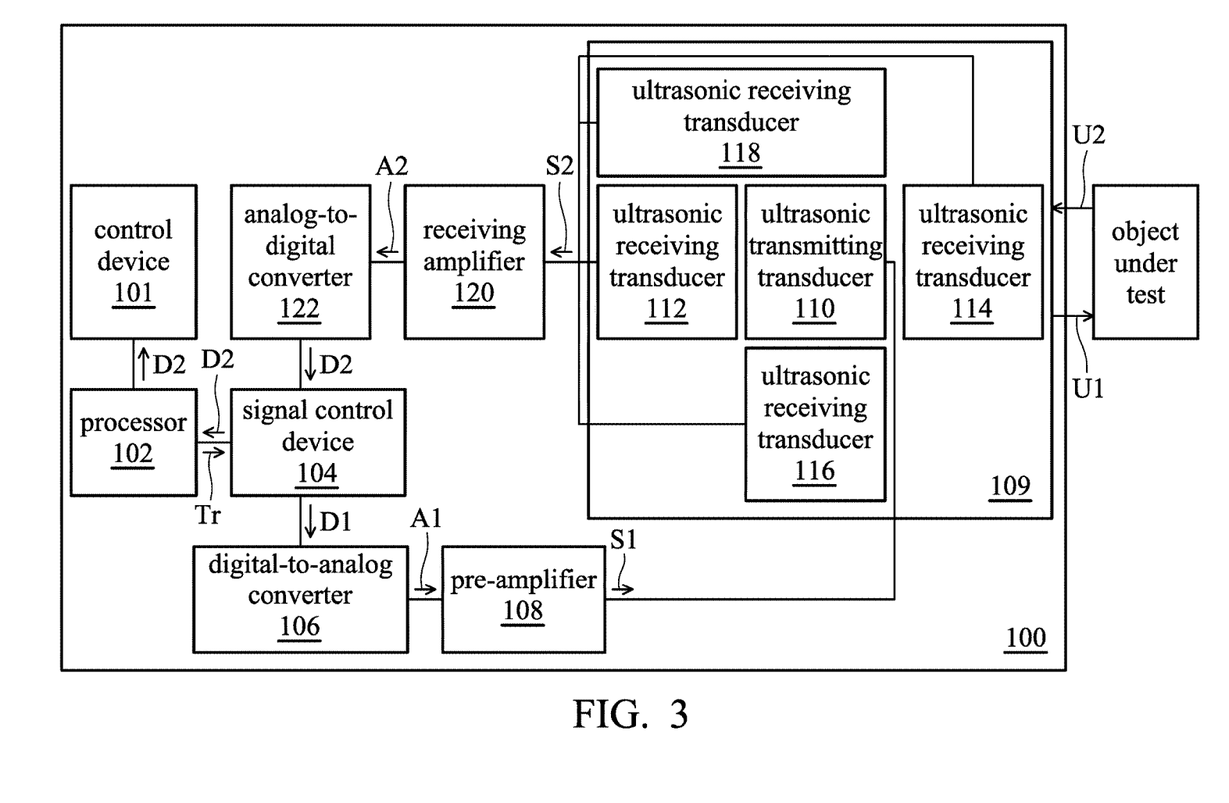
FIG. 3 is a schematic diagram of another electronic device according to an embodiment of the present invention.

FIG. 3 is a schematic diagram of another electronic device 300 according to an embodiment of the present invention. The electronic device 300 is similar to the electronic device 100 shown in FIG. 1, and the difference is that the electronic device 300 has one additional ultrasonic receiving transducer 118 and the arrangements of the ultrasonic receiving transducers 112, 114, and 116 are different from those in FIG. 1.

The ultrasonic transmitting transducer 110 and the ultrasonic receiving transducers 112, 114, 116, and 118 are located on the same plane. The ultrasonic transmitting transducer 110 serves as the origin of the plane and the ultrasonic receiving transducers 112 and 114 are arranged along a first axis. The ultrasonic receiving transducers 112 and 114 are located on opposite sides of the first axis. The ultrasonic transmitting transducer 110 serves as the origin of the plane and the ultrasonic receiving transducers 116 and 118 are arranged along a second axis. The ultrasonic receiving transducers 116 and 118 are located on opposite sides of the second axis. The ultrasonic receiving transducers 112, 114, 116, and 118 respectively receive the ultrasonic signal U2 reflected by the object to be tested. The ultrasonic receiving transducers 112, 114, 116, and 118 transmit the receiving signal S2 respectively to the receiving amplifier 120 after converting the ultrasonic signal U2 into the receiving signal S2. In one embodiment of the present invention, the first axis is the x-axis and the second axis is the y-axis. In another embodiment of the present invention, the first axis and the second axis are perpendicular to each other. In another embodiment of the present invention, the first axis and the second axis are only interlocked with each other.

Figure 3A:
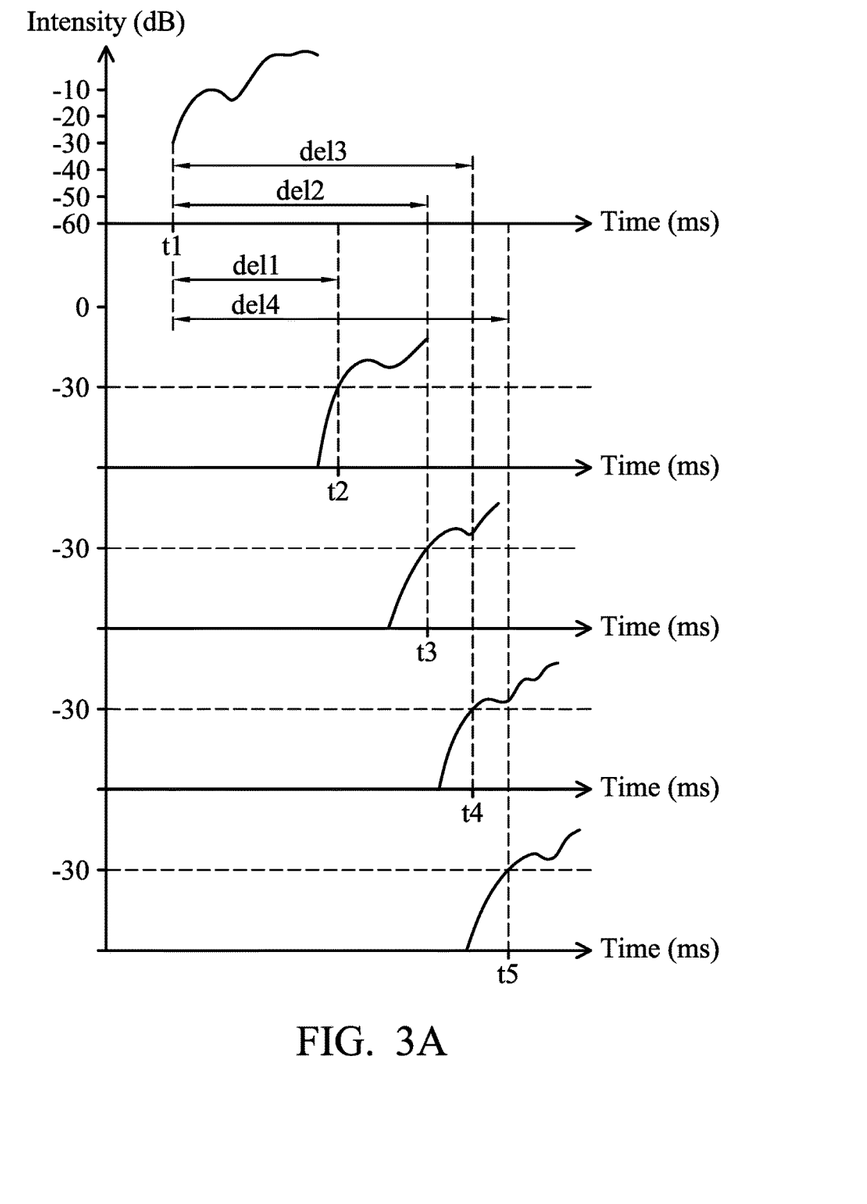
FIG. 3A is an intensity-time diagram for an ultrasonic transmitting transducer and ultrasonic receiving transducers in an electronic device.

The processor 102 calculates the relative positions of the object to be tested and the ultrasonic transmitting transducer 110 according to a first time difference del1, a second time difference del2, a third time difference del3, and a fourth time difference del4 (shown in FIG. 3A). The first time difference del1, the second time difference del2, the third time difference del3, and the fourth time difference del4 (shown in FIG. 3A) are related to the time point at which the ultrasonic signal U1 is transmitted by the ultrasonic transmitting transducer 110 (the first time point t1 shown in FIG. 3A) and the points in time point at which the ultrasonic signal U2 is received by the ultrasonic receiving transducers 112, 114, 116, and 118 (the second time point t2, the third time point t3, the fourth time point t4, and the fifth time point t5 shown in FIG. 3A). The processor 102 multiplies the first time difference del1, the second time difference del2, the third time difference del3, and the fourth time difference del4 (shown in FIG. 3A) respectively by the transmitting speed of the second ultrasonic signal U2 in the medium (for example: water, air, and the like) to obtain a first distance d21, a second distance d31, a third distance d41, and a fourth distance d51 (shown in FIG. 3B). The processor 102 calculates the relative positions of the object to be tested and the ultrasonic transmitting transducer 110 according to the first distance d21, the second distance d31, the third distance d41, and the fourth distance d51 (shown in FIG. 3B).

FIG. 3A is an intensity-time diagram for an ultrasonic transmitting transducer 110 and ultrasonic receiving transducers 112, 114, 116, and 118 in an electronic device 100. As shown in FIG. 1B, the time when the magnitude of the ultrasonic signal U2 is increased to −30 dB is defined as the second time point t2, the time when the magnitude of the ultrasonic signal U2 is increased to −30 dB is also defined as the third time point t3, the time when the magnitude of the ultrasonic signal U2 is increased to −30 dB is defined as the fourth time point t4, and the time when the magnitude of the ultrasonic signal U2 is increased to −30 dB is defined as the fifth time point t5. In one embodiment of the present invention, the first time point t1, the second time point t2, the third time point t3, the fourth time point t4, and the fifth time point t5 could be the same. In another embodiment of the present invention, the first time point t1, the second time point t2, the third time point t3, the fourth time point t4, and the fifth time point t5 could be different.

The processor 102 then calculates the first distance d21 (shown in FIG. 3B) according to the first time difference del1 between the first time point t1 and the second time point t2, calculates the second distance d31 (shown in FIG. 3B) according to the second time difference del2 between the first time point t1 and the third time point t3, calculates the third distance d41 (shown in FIG. 3B) according to the third time difference del3 between the first time point t1 and the fourth time point t4, and calculates the fourth distance d51 (shown in FIG. 3B) according to the fourth time difference del4 between the first time point t1 and the fifth time point t5.

Figure 3B:
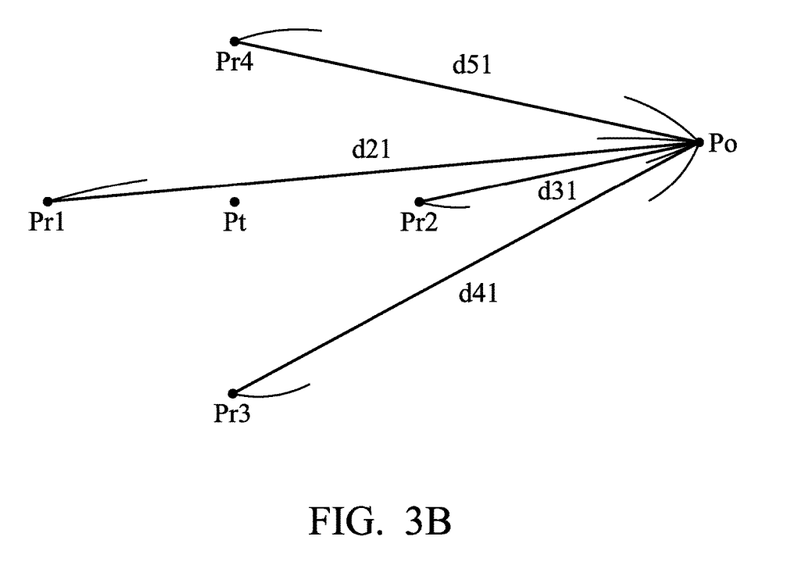
FIG. 3B is another schematic diagram illustrating the calculation of the relative positions of the ultrasonic transducer devices and the object to be tested by an electronic device.

FIG. 3B is another schematic diagram illustrating the calculation of the relative positions of the ultrasonic transducer devices and the object to be tested in an electronic device 300. The position from which the ultrasonic transmitting transducer 110 transmits the ultrasonic signal U1 is defined as the position Pt, the position of the object to be tested is defined as the position Po, the position from which the ultrasonic receiving transducer 112 receives the ultrasonic signal U2 that has been reflected by the object to be tested is defined as the position Pr1, the position at which the ultrasonic receiving transducer 114 receives the ultrasonic signal U2 that has been reflected by the object to be tested is defined as the position Pr2, the position upon receiving the ultrasonic signal U2 reflected by the object to be tested by the ultrasonic receiving transducer 116 is defined as the position Pr3, and the position upon receiving the ultrasonic signal U2 reflected by the object to be tested by the ultrasonic receiving transducer 118 is defined as the position Pr4. The first distance d21 is the distance between the positions Pr1 and Po, the second distance d31 is the distance between the positions Pr2 and Po, the third distance d41 is the distance between the positions Pr3 and Po, and the fourth distance d51 is the distance between the positions Pr4 and Po.

In the embodiment of the present invention, the processor 102 obtains the relative position of the object to be tested according to the first distance d21, the second distance d31, the third distance d41, and the fourth distance d51 (different from the distances mentioned in the step S100 of FIG. 2B). In detail, after the processor 102 obtains the first distance d21, the processor 102 calculates the long axis of a first ellipsoid as half of the first distance d21, the positions of the ultrasonic receiving transducer 112 and the ultrasonic transmitting transducer 110 are regarded as two focuses of the ellipsoid, and a first three-dimensional Cartesian coordinate system ellipsoid equation is obtained. Similarly, a second three-dimensional Cartesian coordinate system ellipsoid equation is obtained for the ultrasonic receiving transducer 114. The difference from the embodiment of the electronic device 300 is that the processor 102 obtains a first crossed-line according to the first and second three-dimensional Cartesian coordinate system ellipsoid equations, and first crossed-line is a circumference and provided with a first crossed-line equation. Similarly, the processor 102 obtains the third and fourth three-dimensional Cartesian coordinate system ellipsoid equations for the ultrasonic receiving transducers 116 and 118. A second crossed-line is obtained from the third and fourth three-dimensional Cartesian coordinate system ellipsoid equation, and second crossed-line is a circumference and provided with a second crossed-line equation. The processor 102 then calculates the X coordinate and Y coordinate of the object to be tested according to the first and second three-dimensional Cartesian coordinate system ellipsoid equation. Finally, the processor 102 substitutes the X coordinate and Y coordinate of the object to be tested into one of the first and second three-dimensional Cartesian coordinate system ellipsoid equation, and then the processor 102 calculates the Z coordinate of the object to be tested according to Pythagorean Theorem. Because the X coordinate, Y coordinate, Z coordinate of the object to be tested are all determined, the processor 102 calculates the position of the object to be tested.

In one embodiment of the present invention, if the position from which the ultrasonic transmitting transducer 110 transmits the ultrasonic signal U1 (position Pt) serves as an origin of the three-dimensional Cartesian coordinate systems and the first distance d21 is equal to the second distance d31, the X coordinate Po,x of the position Po of the object to be tested is zero. In another embodiment of the present invention, if the position from which the ultrasonic transmitting transducer 110 transmits the ultrasonic signal U1 (position Pt) serves as an origin of the three-dimensional Cartesian coordinate system and the third distance d41 is equal to the fourth distance d51, the Y coordinate Po,y of the position Po of the object to be tested is zero. In another embodiment of the present invention, if the position from which the ultrasonic transmitting transducer 110 transmits the ultrasonic signal U1 (position Pt) serves as an origin of the three-dimensional Cartesian coordinate system and the first distance d21 is not equal to the second distance d31, the processor 102 calculates the X coordinate Po,x of the position Po of the object to be tested according to the first crossed-line equation. The processor 102 then obtains a first Z coordinate Po,z1 of the position Po of the object to be tested according to the Pythagorean Theorem.

$$P_{o,x} = \frac{-P1 - N1}{2M1}$$

$$M1 = \left[\frac{\left(\frac{d_{31}^2}{4} - 1\right)}{\left(\frac{d_{31}^2}{4}\right)}\right] - \left[\frac{\left(\frac{d_{21}^2}{4} - 1\right)}{\left(\frac{d_{21}^2}{4}\right)}\right]$$

$$N1 = -2 \times \left\{\left[\frac{\left(\frac{d_{31}^2}{4} - 1\right)}{\left(\frac{d_{31}^2}{4}\right)}\right] + \left[\frac{\left(\frac{d_{21}^2}{4} - 1\right)}{\left(\frac{d_{21}^2}{4}\right)}\right]\right\}$$

$$O1 = M1 + \frac{d_{21}^2}{4} - \frac{d_{31}^2}{4}$$

$$P1 = \sqrt{N1 \times N1 - 4 \times M1 \times O1}$$

$$P_{o,z1} = \sqrt{\frac{d_{21}^2}{4} - 1 - \left\{\frac{\left(\frac{d_{21}^2}{4} - 1\right) \times (P_{o,x} + 1)(P_{o,x} + 1)}{\frac{d_{21}^2}{4}}\right\}}$$

Similarly, the processor 102 calculates the Y coordinate Po,y of the position Po of the object to be tested according to the second crossed-line equation. The processor 102 then obtains a second Z coordinate Po,z2 of the position Po of the object to be tested according to the Pythagorean Theorem.

$$P_{o,y} = \frac{-P2 - N2}{2M2}$$

$$M2 = \left[\frac{\left(\frac{d_{51}^2}{4} - 1\right)}{\left(\frac{d_{51}^2}{4}\right)}\right] - \left[\frac{\left(\frac{d_{41}^2}{4} - 1\right)}{\left(\frac{d_{41}^2}{4}\right)}\right]$$

$$N2 = -2 \times \left\{ \left[ \frac{\left(\frac{d_{51}^2}{4} - 1\right)}{\left(\frac{d_{51}^2}{4}\right)} \right] + \left[ \frac{\left(\frac{d_{41}^2}{4} - 1\right)}{\left(\frac{d_{41}^2}{4}\right)} \right] \right\}$$

$$O2 = M2 + \frac{d_{41}^2}{4} - \frac{d_{51}^2}{4}$$

$$P2 = \sqrt{N2 \times N2 - 4 \times M2 \times P2}$$

$$P_{o,z_1} = \sqrt{\frac{d_{41}^2}{4} - 1 - \left\{ \frac{\left(\frac{d_{41}^2}{4} - 1\right) \times (P_{o,y} + 1)(P_{o,y} + 1)}{\frac{d_{41}^2}{4}} \right\}}$$

Finally, the processor 102 obtains a Z coordinate Po,z by averaging the values of the first Z coordinate Po,z1 and second Z coordinate Po,z2 of the position Po.

$$P_{o,z} = \frac{\left(\sqrt{P_{o,z_1}^2 - P_{o,x}^2} + \sqrt{P_{0,z_2}^2 - P_{o,y}^2}\right)}{2}$$

As a result, the X coordinate Po,x, the Y coordinate Po,y, and the Z coordinate Po,z of the position Po of the object to be tested are all determined, so the processor 102 calculates the position of the object to be tested. It should be noted that the number of the ultrasonic receiving transducers could be four in step S60 in another embodiment of the present invention (the ultrasonic receiving transducers 112, 114, 116, and 118).

Unlike conventional methods, the complexity of the calculation by the processor 102 is greatly decreased because of the calculation method in the present invention. As a result, the processor 102 calculates the position of the object to be tested more quickly.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. An electronic device, comprising:
   an ultrasonic transmitting transducer, arranged to transmit a first ultrasonic signal, at a first time point, to an object to be tested, wherein the first ultrasonic signal is reflected by the object to be tested to serve as a second ultrasonic signal;
   first, second and third ultrasonic receiving transducers, arranged to receive the second ultrasonic signal; and
   a processor, configured to use Short-Time Fourier Transform to calculate a second time point, a third time point, and a fourth time point at which the first to the third ultrasonic receiving transducers receive the second ultrasonic signal, and to calculate a first to a third distances according to the second time point, the third time point, and the fourth time point, wherein the first distance is between the object to be tested and the first ultrasonic receiving transducer, the second distance is between the object to be tested and the second ultrasonic receiving transducer, and the third distance is between the object to be tested and the third ultrasonic receiving transducer;
   wherein the processor is further configured to obtain three three-dimensional Cartesian coordinate system ellipsoid equations according to a position of the ultrasonic transmitting transducer, positions of the first to the third ultrasonic receiving transducers, and the first to the third distances, use the position of the ultrasonic transmitting transducer to serve as an origin, and then use the three three-dimensional Cartesian coordinate system ellipsoid equations to calculate a relative position of the object to be tested.

2. The electronic device as claimed in claim 1, wherein the processor utilizes the first time point and the second time point to obtain a first time difference, the first time point and the third time point to obtain a second time difference, and the first time point and the fourth time point to obtain a third time difference.

3. The electronic device as claimed in claim 2, wherein the processor multiplies the first time difference by a transmitting speed of the first ultrasonic signal to obtain the first distance, multiplies the second time difference by the transmitting speed of the first ultrasonic signal to obtain the second distance, and multiplies the third time difference by the transmitting speed of the first ultrasonic signal to obtain the third distance.

4. The electronic device as claimed in claim 1, further comprising a control device, wherein the control device performs a corresponding action according to information about the relative position of the object to be tested.

5. The electronic device as claimed in claim 4, wherein the corresponding action is a moving action or a clicking action of a mouse on a screen.

6. An electronic device, comprising:
   an ultrasonic transmitting transducer, arranged to transmit a first ultrasonic signal, at a first time point, to an object to be tested, wherein the first ultrasonic signal is reflected by the object to be tested to serve as a second ultrasonic signal;
   first, second, third, and fourth ultrasonic receiving transducers, arranged to receive the second ultrasonic signal, wherein the first to the fourth ultrasonic receiving transducers, and the ultrasonic transmitting transducer are located on a plane, the ultrasonic transmitting transducer serves as an origin of the plane, the first and the second ultrasonic receiving transducers are arranged along a first axis, and the third and the fourth ultrasonic receiving transducers are arranged along a second axis; and
   a processor, configured to use Short-Time Fourier Transform to calculate a second time point, a third time point, a fourth time point, and a fifth time point at which the first to the fourth ultrasonic receiving transducers receive the second ultrasonic signal, and to calculate a first to a fourth distances according to the second time point, the third time point, the fourth time point, and the fifth time point, wherein the first distance is between the object to be tested and the first ultrasonic receiving transducer, the second distance is between the object to be tested and the second ultrasonic receiving transducer, the third distance is between the object to be tested and the third ultrasonic receiving transducer, and the fourth distance is between the object to be tested and the fourth ultrasonic receiving transducer;
   wherein the processor is further configured to obtain four three-dimensional Cartesian coordinate system ellipsoid equations according to a position of the ultrasonic transmitting transducer, positions of the first to the fourth ultrasonic receiving transducers, and the first to the fourth distances, use the position of the ultrasonic transmitting transducer to serve as an origin, and then use the four three-dimensional Cartesian coordinate system ellipsoid equations to calculate a relative position of the object to be tested.

7. The electronic device as claimed in claim 6, wherein the processor utilizes the first time point and the second time point to obtain a first time difference, the first time point and the third time point to obtain a second time difference, the first time point and the fourth time point to obtain a third time difference, and the first time point and the fifth time point to obtain a fourth time difference.

8. The electronic device as claimed in claim 7, wherein the processor multiplies the first time difference by a transmitting speed of the first ultrasonic signal to obtain the first distance, multiplies the second time difference by the transmitting speed of the first ultrasonic signal to obtain the second distance, multiplies the third time difference by the transmitting speed of the first ultrasonic signal to obtain the third distance, and multiplies the fourth time difference by the transmitting speed of the first ultrasonic signal to obtain the fourth distance.

9. The electronic device as claimed in claim 6, further comprising a control device, wherein the control device performs a corresponding action according to information about the relative position of the object to be tested.

10. The electronic device as claimed in claim 9, wherein the corresponding action is a moving action or a clicking action of a mouse on a screen.

11. The electronic device as claimed in claim 6, wherein the first axis and the second axis are perpendicular to each other.

12. An operation method of an electronic device, comprising:
   transmitting, by an ultrasonic transmitting transducer, a first ultrasonic signal, at a first time point, to an object to be tested, wherein the first ultrasonic signal is reflected by the object to be tested as a second ultrasonic signal;
   receiving the second ultrasonic signal by first, second and third ultrasonic receiving transducers;
   utilizing the Short-Time Fourier Transform to calculate a second time point, a third time point, and a fourth time point at which the first to the third ultrasonic receiving transducers receive the second ultrasonic signal; and
   calculating a first to a third distances using values of the second time point, the third time point, and the fourth time point, wherein the first distance is between the object to be tested and the first ultrasonic receiving transducer, the second distance is between the object to be tested and the second ultrasonic receiving transducer, and the third distance is between the object to be tested and the third ultrasonic receiving transducer;
   obtaining three three-dimensional Cartesian coordinate system ellipsoid equations according to the position of the ultrasonic transmitting transducer, positions of the first, second and third ultrasonic receiving transducers, the first distance, the second distance, and the third distance; and
   calculating a relative position of the object to be tested using the three three-dimensional Cartesian coordinate system ellipsoid equations, and using the position of the ultrasonic transmitting transducer to serve as an origin.

13. The operation method as claimed in claim 12, wherein the step of calculating the relative positions of the object to be tested and the ultrasonic transmitting transducer comprises:
   utilizing the first time point and the second time point to obtain a first time difference;
   utilizing the first time point and the third time point to obtain a second time difference; and
   utilizing the first time point and the fourth time point to obtain a third time difference.

14. The operation method as claimed in claim 13, wherein the step of calculating the relative positions of the object to be tested and the ultrasonic transmitting transducer further comprises:
   obtaining the first distance by multiplying the first time difference by a transmitting speed of the first ultrasonic signal;
   obtaining the second distance by multiplying the second time difference by the transmitting speed of the first ultrasonic signal; and
   obtaining the third distance by multiplying the third time difference by the transmitting speed of the first ultrasonic signal.

15. The operation method as claimed in claim 12, further comprising:
   performing a corresponding action according to information about the relative position of the object to be tested.

* * * * *